(12) United States Patent
Lee et al.

(10) Patent No.: US 7,397,158 B2
(45) Date of Patent: Jul. 8, 2008

(54) MOTOR FOR WASHING MACHINE

(75) Inventors: Deug Hee Lee, Changwon-si (KR);
Seung Bong Choi, Changwon-si (KR);
Byung Hwan Ahn, Changwon-si (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/020,393

(22) Filed: Dec. 27, 2004

(65) Prior Publication Data

US 2005/0140232 A1 Jun. 30, 2005

(30) Foreign Application Priority Data

| Dec. 26, 2003 | (KR) | ........................ 10-2003-0097838 |
| Dec. 26, 2003 | (KR) | ........................ 10-2003-0097839 |
| Dec. 26, 2003 | (KR) | ........................ 10-2003-0097840 |
| Dec. 26, 2003 | (KR) | ........................ 10-2003-0097841 |

(51) Int. Cl.
*H02K 1/27* (2006.01)
*H02K 5/16* (2006.01)
*D06F 29/00* (2006.01)

(52) U.S. Cl. ................ 310/156.26; 310/43; 68/23.7
(58) Field of Classification Search .................. 310/91, 310/156.08, 156.26, 67 R, 51, 43, 261; 68/23.7, 68/24–25, 58, 140
See application file for complete search history.

(56) References Cited

U.S. PATENT DOCUMENTS

| 4,546,282 | A | | 10/1985 | Hartwig | |
| 4,623,812 | A | * | 11/1986 | van de Griend | ............. 310/268 |
| 5,737,944 | A | | 4/1998 | Nishimura et al. | |
| 5,907,206 | A | | 5/1999 | Shiga et al. | |
| 6,049,930 | A | | 4/2000 | Hisano et al. | |
| 6,396,190 | B1 | * | 5/2002 | Ahn et al. | ................... 310/261 |
| 6,460,382 | B1 | * | 10/2002 | Kim et al. | ..................... 68/140 |
| 6,564,594 | B1 | * | 5/2003 | Ito et al. | ......................... 68/24 |
| 2003/0132675 | A1 | | 7/2003 | Kwon et al. | |

FOREIGN PATENT DOCUMENTS

| DE | 3143485 | | 5/1983 |
| EP | 0357777 | A1 | 3/1990 |
| EP | 1018795 | A1 | 7/2000 |
| EP | 1094144 | A2 | 4/2001 |
| FR | 2698945 | | 6/1994 |
| JP | 59037874 | | 3/1984 |
| JP | 61022735 | | 1/1986 |
| JP | 2000-325693 | | 11/2000 |
| JP | 2000325693 | | 11/2000 |

* cited by examiner

*Primary Examiner*—Tran Nguyen
(74) *Attorney, Agent, or Firm*—McKenna Long & Aldridge LLP

(57) ABSTRACT

A motor for a washing machine including a driving shaft coupled to a drum, a stator for forming a magnetic field with a coil wound on a core, and a rotor rotatably mounted on an outside of the stator coupled to the driving shaft for driving the driving shaft, wherein the rotor includes a rotor frame having magnets attached to an inside surface of an outer end, a back yoke on an outside surface of the outer end for reinforcing the rotor frame and forming a magnetic path, a shaft supporting housing at a center of the rotor frame having one end portion of the driving shaft secured thereto, a bushing of a non-conductive resin having the shaft supporting housing formed as one body at a center, the bushing being secured to the rotor frame, and fastening members for fastening the bushing to the rotor frame.

41 Claims, 18 Drawing Sheets

MOTOR FOR WASHING MACHINE

CROSS-REFERENCE TO RELATED APPLICATIONS

This application claims the benefit of Korean Application Nos. P2003-0097838, P2003-0097839, P2003-0097840, P2003-0097841, all of which were filed on Dec. 26, 2003, and are hereby incorporated by reference as if fully set forth herein.

BACKGROUND OF THE INVENTION

1. Field of the Invention

The present invention relates to motors for washing machines, and more particularly, a direct coupling type motor for a washing machine, which is directly coupled to a drum of the washing machine, for rotating the drum.

2. Discussion of the Related Art

A rotor of a related art motor for the washing machine which is entirely injection molded of plastic, requires a complicated mold and fabrication process, and is liable to shrinkage during cooling of the injection molded plastic, thereby being unable to obtain an original shape.

FIG. 1 illustrates a section of a rotor of a motor of a related art washing machine.

Referring to FIG. 1, the related art rotor is provided with a rotor frame 1 of injection molded plastic which forms an exterior of the rotor, magnets 3 secured to an inside surface of an outer edge of the rotor frame 1, each with an N-pole and an S-pole arranged alternately, a back yoke 2 on an outer side of the magnets 3 for forming a flux path, heat dissipation frames 7 formed as one body with the rotor frame 1 on an underside thereof for forced movement of air to cool the motor, a driving shaft 5 inserted in a pass through hole in a central portion of the rotor frame 1, a serration 4 at a portion where the driving shaft 5 and the rotor frame 1 come into contact for secure rotation of the driving shaft 5, a fastening bolt 6 inserted in and fastened to the driving shaft 5, and reinforcing ribs 8 projecting from an upper side and/or a lower side of the rotor frame 1, for reinforcing the rotor frame 1.

The plastic rotor of the related art washing machine has a hazard in that the rotor is liable to deform by an external impact. Also, the complicated rotor shape complicates the mold used for injection molding, thereby making injection molding difficult.

Moreover, since the injection molded plastic may undergo deformation after the injection molding, an injection molded body is liable to have a shape different from a desired shape. If fabrication of the rotor frame 1 to exact dimensions fails due to deformation that occurs during the injection molding process, particularly, a cooling process, the rotor frame 1 causes interference with other parts, such as a stator of the motor, thereby potentially causing the inoperability of a washing machine which uses these parts.

If the plastic is flexible, the rotor frame 1 may be deformed by external force which may occur during operation of the washing machine, and interfere with other parts, thereby potentially causing the inoperability of a washing machine inoperative which uses these parts.

SUMMARY OF THE INVENTION

Accordingly, the present invention is directed to a motor for a washing machine that substantially obviates one or more problems due to limitations and disadvantages of the related art.

An object of the present invention is to provide a motor for a washing machine which can improve security of operation of the washing machine.

Another object of the present invention is to provide a motor for a washing machine which requires simplified injection molding to enable simple fabrication to save production costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a motor for a washing machine, including a driving shaft coupled to a drum of the washing machine, a stator for forming a magnetic field by means of a coil wound on a core, and a rotor rotatably mounted on an outside of the stator coupled to the driving shaft for driving the driving shaft, wherein the rotor including a rotor frame of metal having magnets attached to an inside surface of an outer end, a back yoke on an outside surface of the outer end of the rotor frame for reinforcing the rotor frame and forming a magnetic path, a shaft supporting housing at a center of the rotor frame having one end portion of the driving shaft secured thereto, a bushing of a non-conductive resin having the shaft supporting housing formed as one body at a center, the bushing being secured to the rotor frame, and fastening members for fastening the bushing to the rotor frame.

In another aspect of the present invention, a motor for a washing machine includes a driving shaft coupled to a drum of the washing machine, a stator for forming a magnetic field by means of a coil wound on a core, and a rotor rotatably mounted on an outside of the stator coupled to the driving shaft for driving the driving shaft, wherein the rotor includes a rotor frame of metal having magnets attached to an inside surface of an outer end, a back yoke on an outside surface of the outer end of the rotor frame for reinforcing the rotor frame and forming a magnetic path, a shaft supporting housing of metal at a center of the rotor frame having one end portion of the driving shaft secured thereto, a bushing of a non-conductive resin having the shaft supporting housing formed as one body at a center by insert molding, the bushing being secured to the rotor frame, fastening members for fastening the bushing to the rotor frame, and guide members for guiding a fastening position of the bushing to the rotor frame.

In another aspect of the present invention, a motor for a washing machine includes a driving shaft coupled to a drum of the washing machine, a stator for forming a magnetic field by means of a coil wound on a core, and a rotor rotatably mounted on an outside of the stator coupled to the driving shaft for driving the driving shaft, wherein the rotor includes a rotor frame of metal having magnets attached to an inside surface of an outer end, a back yoke on an outside surface of the outer end of the rotor frame for reinforcing the rotor frame and forming a magnetic path, a shaft supporting housing at a center of the rotor frame having one end portion of the driving shaft secured thereto, and a bushing of a non-conductive material insert molded as one body with the shaft supporting housing and the rotor frame, for fixedly securing the shaft supporting housing and the rotor frame.

Thus, the washing machine of the present invention can make stable operation even at spinning, and reduce hazard of current leakage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An entire structure of a drum type washing machine having a motor of the present invention applied thereto will be described, with reference to FIG. 2.

Figure 1:
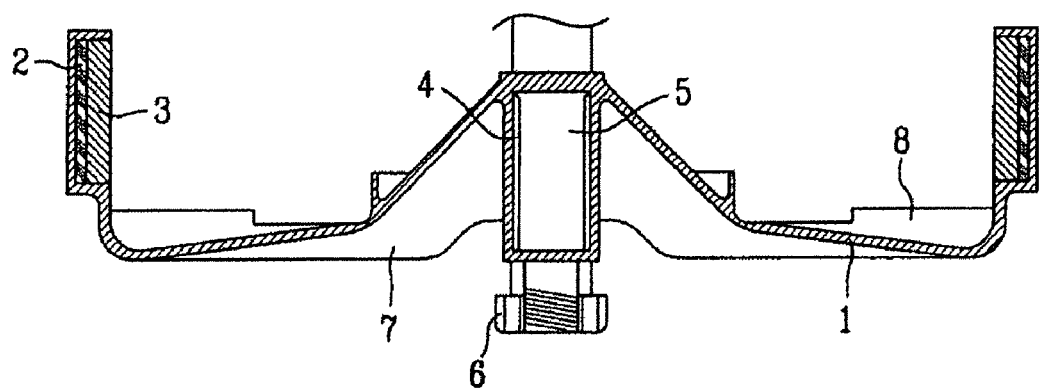
FIG. 1 illustrates a section of a rotor of a motor applied to a related art washing machine.
Figure 2:
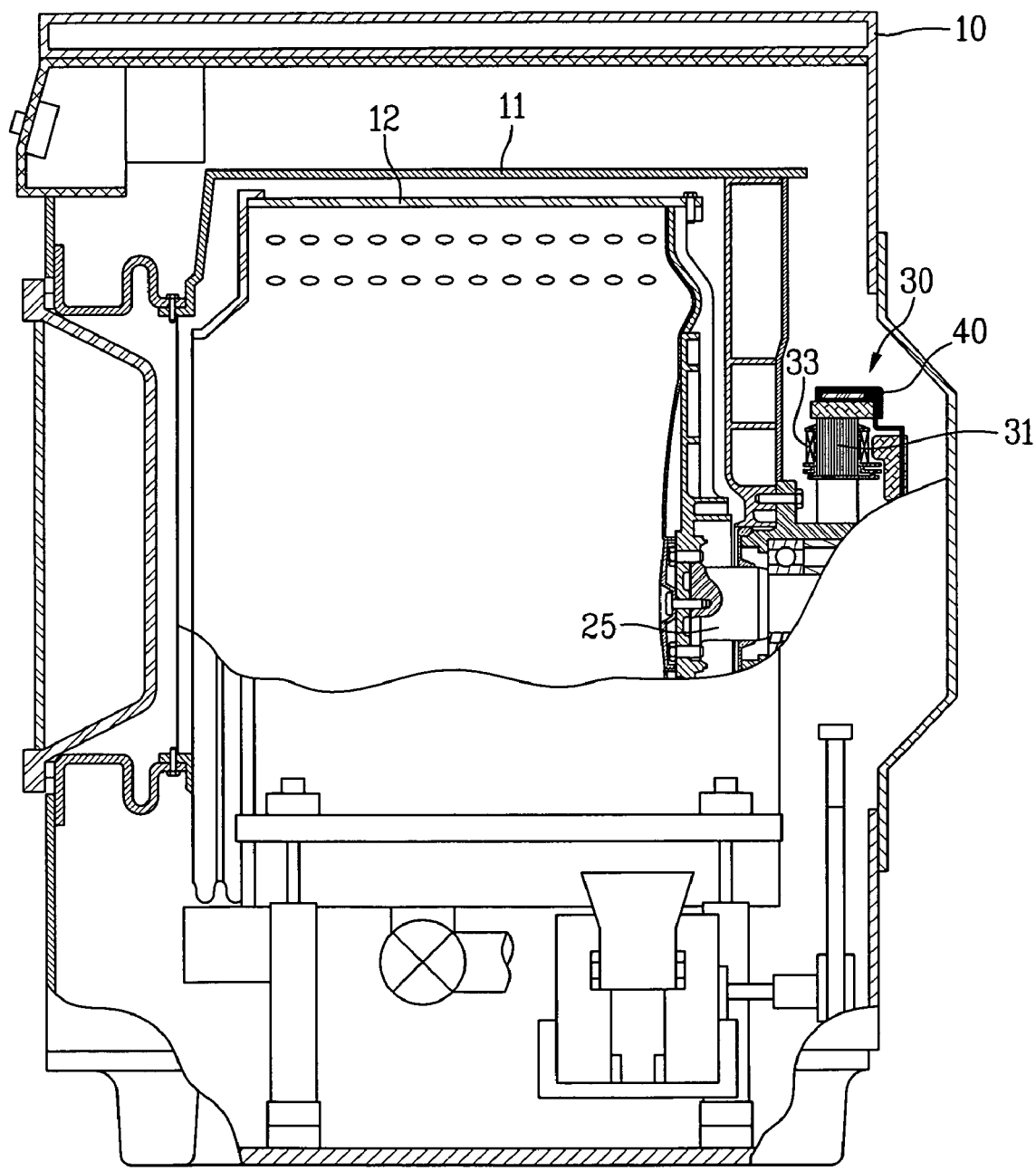
FIG. 2 illustrates a section of a drum type washing machine having a motor of the present invention applied thereto.

Referring to FIG. 2, the drum type washing machine includes a case 10 which forms an exterior of the washing machine, a tub 11 mounted in the case 10 for holding water, a drum 12 mounted in the tub 11 for rotating when water and laundry are held therein to perform washing with friction between the water and the laundry, and a motor 30 directly coupled to a rear end of a driving shaft 25 secured to a rear of the drum 12.

The motor 30 includes a stator 31 secured to a rear of the tub 11, and a rotor 40 rotatably mounted on an outside of the stator 31 having a center portion fixedly coupled to a rear end portion of the driving shaft 25. The stator 31 has coils 33 wound on an outer circumference for receiving external power. The rotor 40 rotates by electromagnetic force generated in relation to the stator 31. Particularly, the motor 30 of the present invention is an outer rotor type motor in which the stator 31 is positioned at an inside and the rotor 40 is positioned at an outside spaced a distance away outwardly from the stator 31. The present invention improve a structure of the rotor 40.

Moreover, it is preferable that the motor for a washing machine of the present invention is a BLDC motor, of which rotation speed, rotation phase, and so on can be controlled with reference to a position of the rotor sensed at a predetermined sensor that senses a rotation state of the rotor.

The operation of the drum type washing machine will be described.

Upon applying an external signal to the motor 30 to start rotation of the rotor 40 of the motor, rotation force is transmitted from the rotor 40 to the drum 12 through the driving shaft 25, and, accordingly, the drum 12 rotates. Since the tub 11 holds the washing water, and the drum 12 holds the washing water and the laundry, the laundry is washed as the drum 12 rotates. Since the driving shaft 25 couples the motor 30 and the drum 12, torque and rotation speed of the motor 30 are transmitted to the drum 12.

A motor in accordance with a first preferred embodiment of the present invention will be described in detail, with reference to FIGS. 3 to 8.

Figure 3:
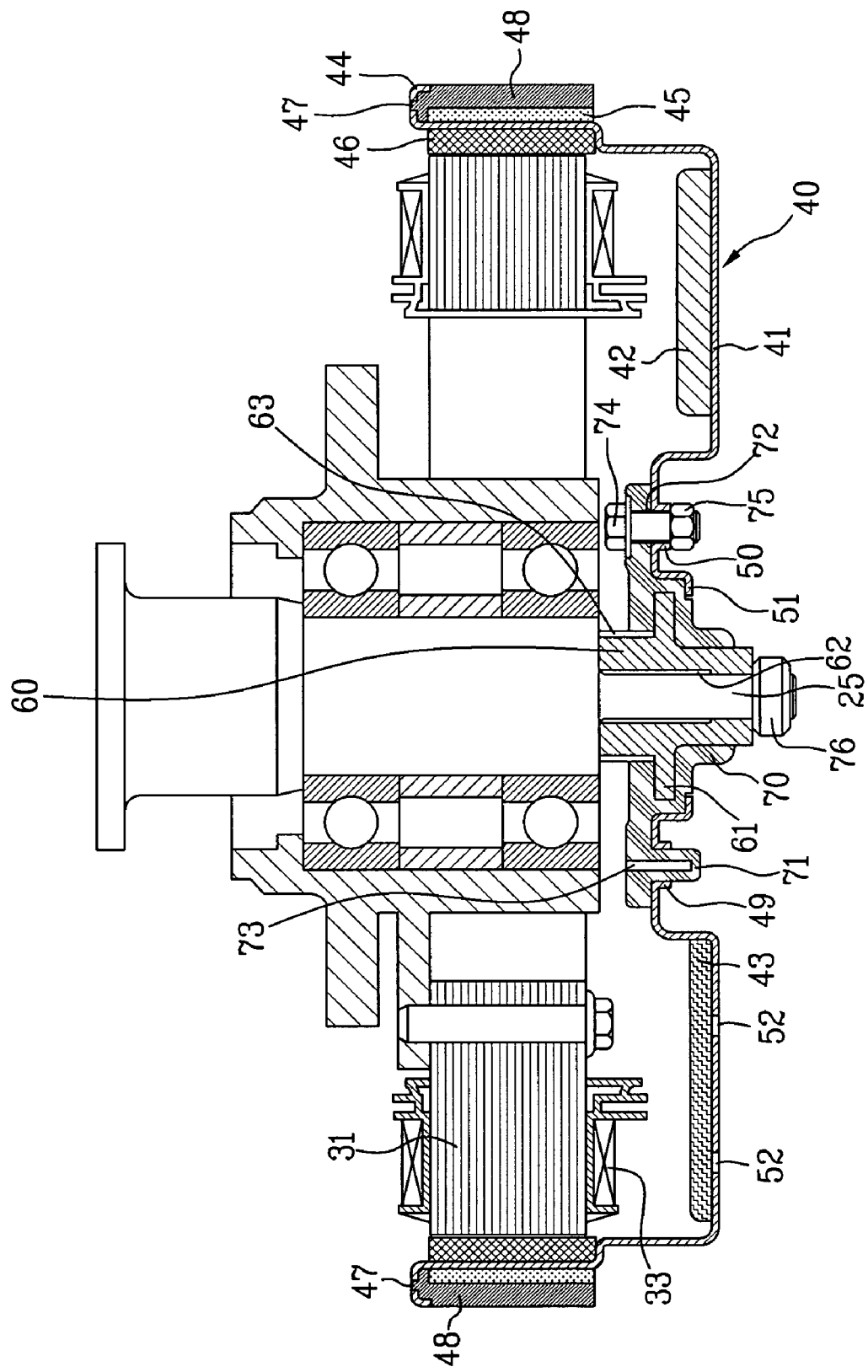
FIG. 3 illustrates a section of key parts of a motor for a washing machine in accordance with a first preferred embodiment of the present invention.

Referring to FIG. 3, the motor includes a stator 31 having a core with a coil wound thereon, and a rotor 40 rotatably mounted on an outside of the stator. As described before, the stator 31 is secured to the tub 11 (see FIG. 2), and the rotor 40 is secured to the drum 12 (see FIG. 2) with the driving shaft 25, in order to transmit a torque from the rotor 40 to the drum 12. The rotor 40 includes a rotor frame 41 of metal which is a main body of the rotor 40, a shaft supporting housing 60 having the driving shaft 25 inserted therein for transmission of the rotating force to the driving shaft 25, a bushing 70 injection molded such that the shaft supporting housing is disposed therein, and secured to the rotor frame 41, and a nut 76 for fastening the driving shaft 25 inserted in the shaft supporting housing 60.

The rotor frame 41 of the rotor 40 is formed of a metal, such as steel. The rotor frame 41 has magnets 46 on an inside surface of an upward bent portion of an outer end portion thereof, and a back yoke 45 on an outside surface of the upward bent portion. Outward and/or downward bent portions at the outer end portion of the rotor frame 41 serve as a reinforcing portion 44 for reinforcing the rotor frame 41. The rotor frame 41 has a molded portion 48 on an outside of the back yoke 45 for securing the back yoke to the rotor frame 41 in order to prevent the back yoke from falling off the rotor frame 41.

For making rigid bonding of the rotor frame 41 and the molded portion 48 in the process the molded portion 48 is injection molded, the rotor frame 41 has a resin adhering portion 47 at a predetermined position where the molded portion 48 is contact. Since the resin of the molded portion 48 is injected into an inside of the resin adhering portion 47 during molding of the molded portion 48, the bonding between the molded portion 48 and the rotor frame 41 can be made more rigidly, to make the molded portion to secure the back yoke 45 more rigidly. The resin adhering portion 47 may be a hole passed through the rotor frame 41 or a recess depressed in the rotor frame 41.

The rotor frame 41 has fins 42 bent from predetermined positions of a horizontal surface for blowing air during rotation of the rotor 40, to cool and dehumidify the motor. There is an embossing 43 at a predetermined position between adjacent fins 42 which has a predetermined shape for reinforcing the rotor frame 41.

The fin 42 blows air toward the stator 31 during rotation of the rotor frame 41. The air flow enables easy vaporization of moisture, such as dew, which can form due to a temperature change of the washing machine by convection. Moreover, by cooling the motor, the air flow prevents the motor from overheating.

The embossing 43 prevents the rotor frame 41 from deforming during rotation of the motor at speeds up to 2,000 rpm, thereby allowing regular operation of the washing machine. The fins 42 and the embossings 43 can be formed simultaneously by pressing a predetermined steel plate cut by punching with a predetermined mold. The rotor frame 41 has drain holes 52 in the horizontal surface for draining water.

In the meantime, the shaft supporting housing 60 is injection molded such that the shaft supporting housing 60 is inserted in the bushing. After the bushing 70 is placed on one side of the rotor frame 41 when the shaft supporting housing 60 is injection molded in the bushing 70, the bushing 70 is fastened to the rotor frame 41 with fastening members, such as bolt, and the like. Since the bushing 70 is formed of resin that is an insulating material, the rotor frame 41 is not conductive with the shaft supporting housing 60.

Figure 4:
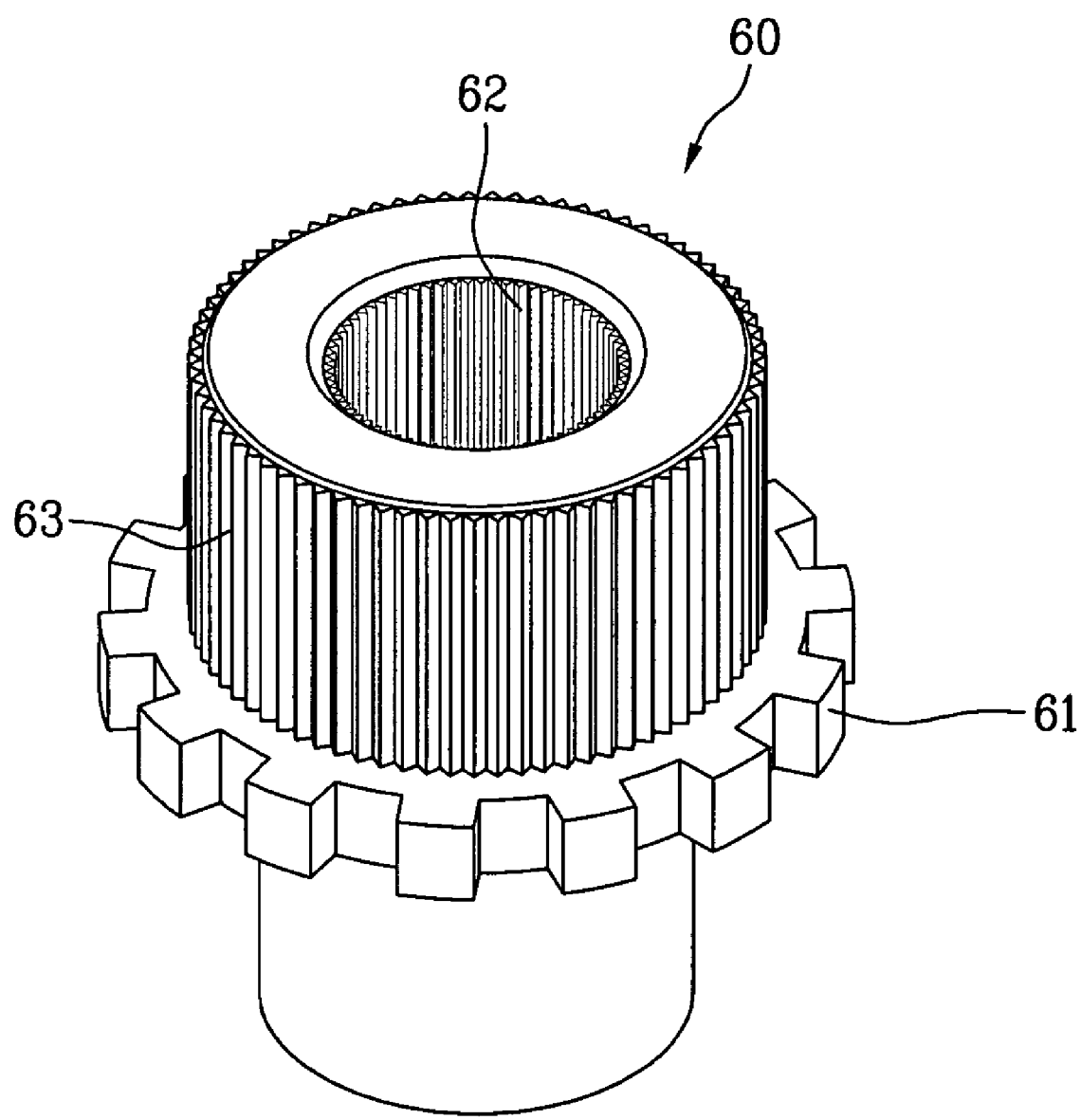
FIG. 4 illustrates a perspective view of the shaft supporting housing in the motor in FIG. 3.

Referring to FIG. 4, the shaft supporting housing 60, which is cylindrical, has a hole in an up/down direction with the driving shaft 25 inserted therein. The shaft supporting housing 60 is formed as one body with the bushing 70 when the bushing 70 is molded of an injection molding liquid. For firm fixing of a position of the shaft supporting housing 60 during injection molding of the bushing 70, the shaft supporting housing 60 has at least one comparatively large projection 61 at an outside circumference, and an external serration 63 over the projection 61. The external serration 63 may be coupled to a shaft different from the driving shaft 25, for transmission of rotation force from the rotor 40. Since the external serration 63 at a lower portion is insert molded with the bushing 70, the coupling of the bushing 70 and the external serration 63 can resist a greater shearing force.

In a center hole having the driving shaft 25 inserted therein, an internal serration 62 extended in an up/down direction in order to prevent slipping between the shaft supporting housing 60 and the driving shaft 25 during rotation of the driving shaft 25.

More conveniently, the shaft supporting housing 60 may be sintered of metal.

Figure 5:
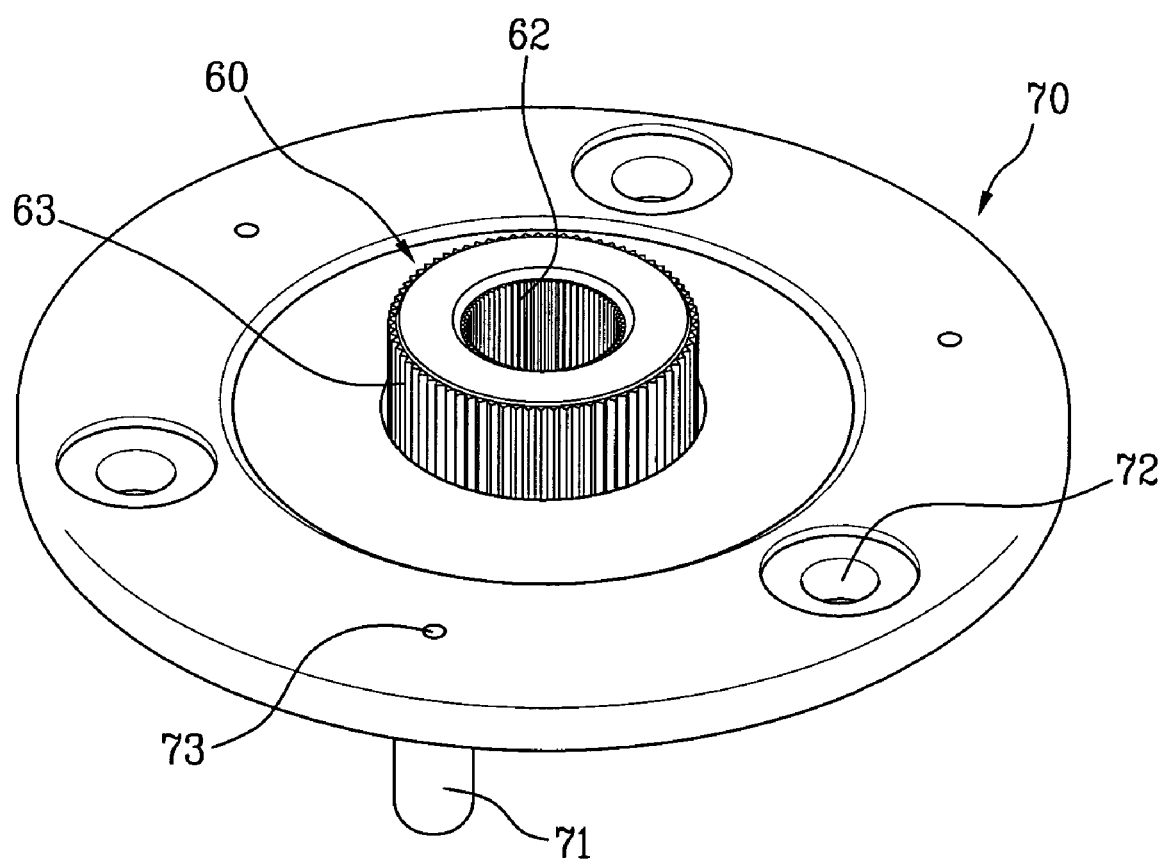
FIG. 5 illustrates a perspective view of the bushing in FIG. 3.

Referring to FIG. 5, the bushing 70 is fabricated as one body with the shaft supporting housing 60 at a center thereof.

It is required that the bushing 70 does not slip on the rotor frame 41 by a shearing force generated during rotation of the rotor 40. In other words, torque induced on the magnets 46 owing to electromagnetic interaction between the stator 31 and the magnets 46 is transmitted to the driving shaft 25 through the rotor frame 41 and the bushing 70, when the bushing 70 is rigidly fixed to the rotor frame 41 for secure transmission of the torque to the driving shaft 25.

For this, the bushing 70 has three seating projections 71 arranged at regular intervals extending downward from the bushing 70, and a plurality of bushing side fastening holes 72 arranged at regular intervals passing through the bushing 70, for inserting bolts 74. In the center portion of the seating projection 71, there is a cooling hole 73 for preventing deformation of the seating projection during cooling down after molding.

Referring to FIG. 3 again, at an opposite portion of the bushing 70, the rotor frame 41 has seating guides 49 for inserting the seating projections 71 respectively, to guide a position of the bushing 70, and frame side fastening holes 50 at positions facing the bushing side fastening holes 72.

Accordingly, the bushing 70 is secured to the rotor frame 41 according to the following process. It should be noted that the shaft supporting housing 60 is inserted in the bushing 70.

At first, for exact and convenient positioning of the bushing 70, the seating projections 71 are inserted in the seating guides 49, respectively. At least two seating projections 71 and the seating guides 49 are formed to enable exact positioning of the bushing 70. The rotor frame 41 has a seating flange 51 for inserting the bushing 70 therein, and the center portion of the bushing 70 is formed to complement the seating flange 51.

In the meantime, the seating projections 71 and the seating guides 49 not only enable convenient seating of the bushing 70, but also serve to prevent separation of the bushing 70 and the rotor frame 41 during rotation of the rotor 40, and to prevent damage to the bushing 70.

When the seating projections 71 are inserted in the seating guides 49 respectively, the frame side fastening holes 50 and the bushing side fastening holes 72 are in an aligned state.

After the bushing 70 is conveniently seated on the seating flange 51 of the rotor frame 51 owing to the seating projections 71 and the seating guides 49, bolts 74 are inserted in the frame side fastening holes 50, and the bushing side fastening holes 72, and nuts 75 are screwed into end portions of the bolts 74, to fasten the bolts 74. With the bolts 74 and the nuts 75, the bushing 70 is rigidly secured to the rotor frame 41. It is preferable that the seating projections 71 and the bushing side fastening holes 72 are formed at equal intervals at equal distances from the center of the bushing 70 alternately, for balancing.

Figure 6:
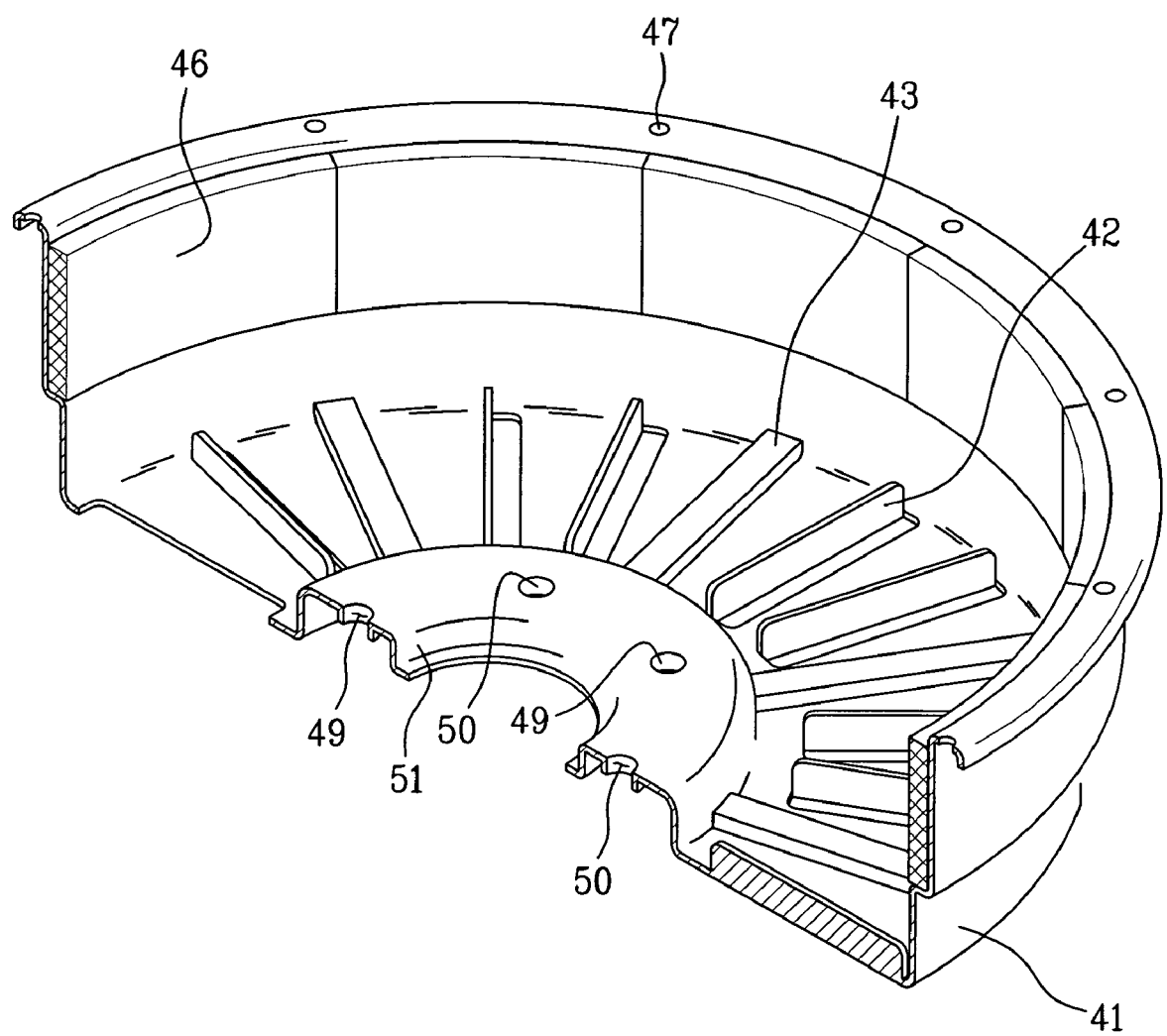
FIGS. 6, 7, and 8 illustrate perspective views of rotor frames showing the steps of a process for fabricating a rotor frame.
Figure 7:
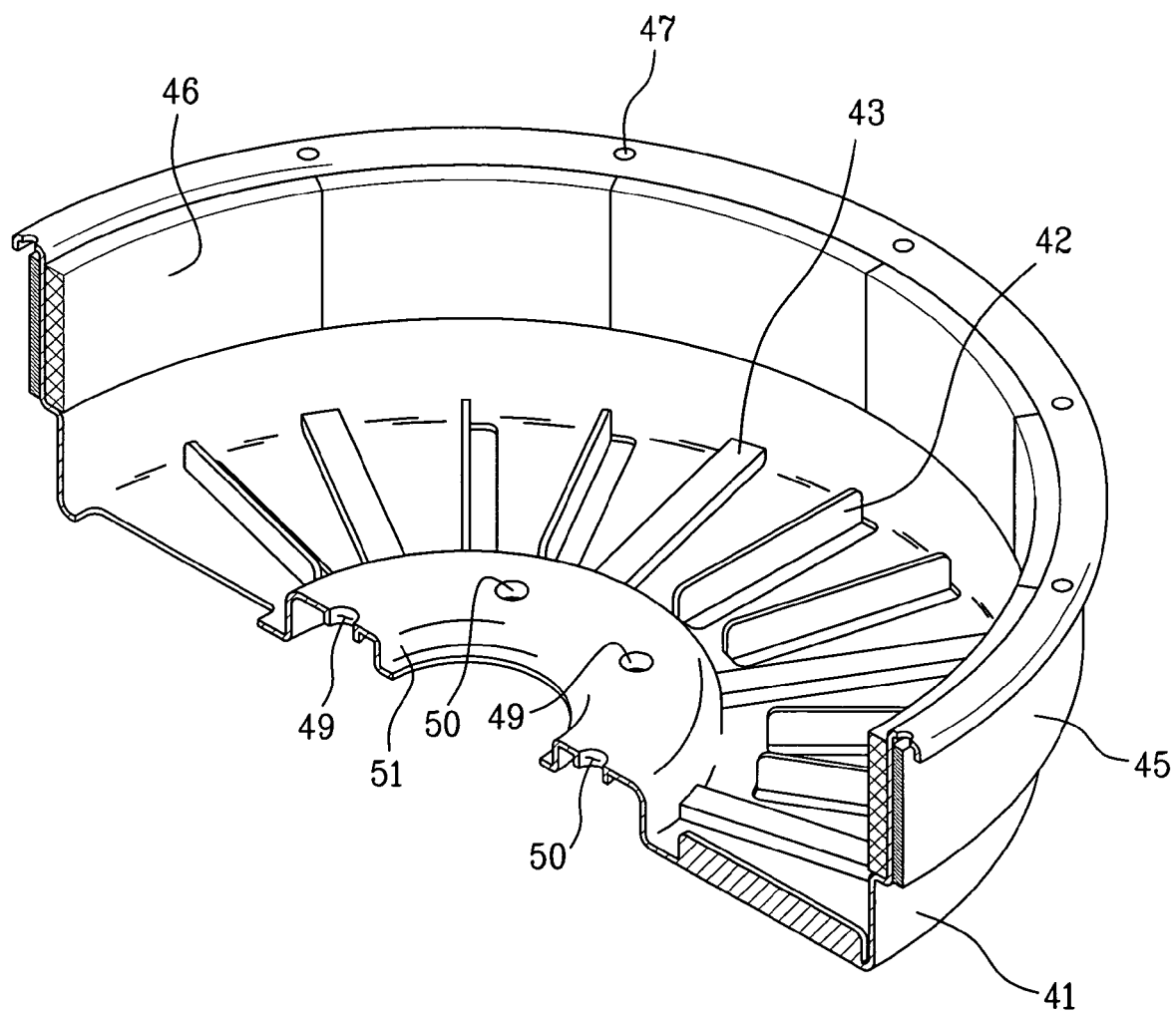
Figure 8:
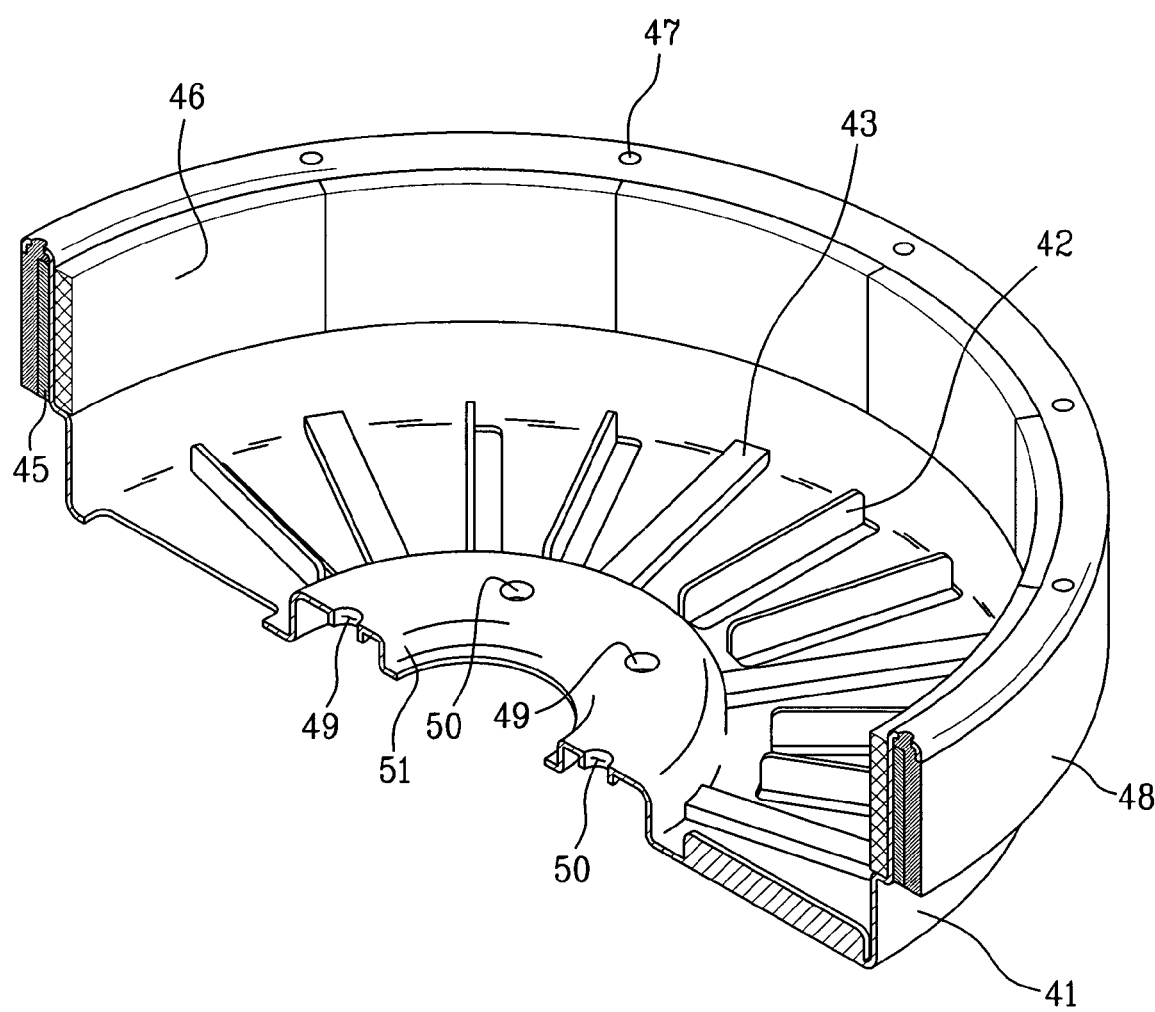

In the meantime, FIGS. 6, 7, and 8 illustrate perspective views of rotor frames showing the steps of a process for fabricating a rotor frame.

As shown, the rotor frame 41 has the magnets 46 and the back yoke 45 placed on inside and outside sidewalls respectively, wherein FIG. 6 illustrates a state the back yoke 45 is not attached thereto yet, and FIG. 7 illustrates a state after the back yoke 45 is attached thereto. The back yoke 45 may be attached to the outside surface of the rotor frame 41 by any method, such as welding, bonding, or press fitting.

FIG. 8 illustrates when the molded portion 48 is formed at an outside of the back yoke 45 by insert molding. During formation of the molded portion 48, the resin is inserted in the resin adhering portion 47, to secure the molded portion 48 to the rotor frame 41 more rigidly.

The molded portion 48 formed to cover the back yoke 45 fully enables rigid attachment of the back yoke 45 such that the back yoke does not fall off the rotor frame 41 during rotation of the rotor 40. As described before, the back yoke 45 not only forms a magnetic path, but also reinforces the outer end of the rotor frame 41 to resist to an external vibration.

In the meantime, though it is shown in the drawing that the molded portion 48 is aligned with the back yoke 45 at a bottom side thereof, the molded portion 48 may also be formed to cover the bottom of the back yoke 45 or cover entirely, to rigidly secure the back yoke 45.

Figure 9:
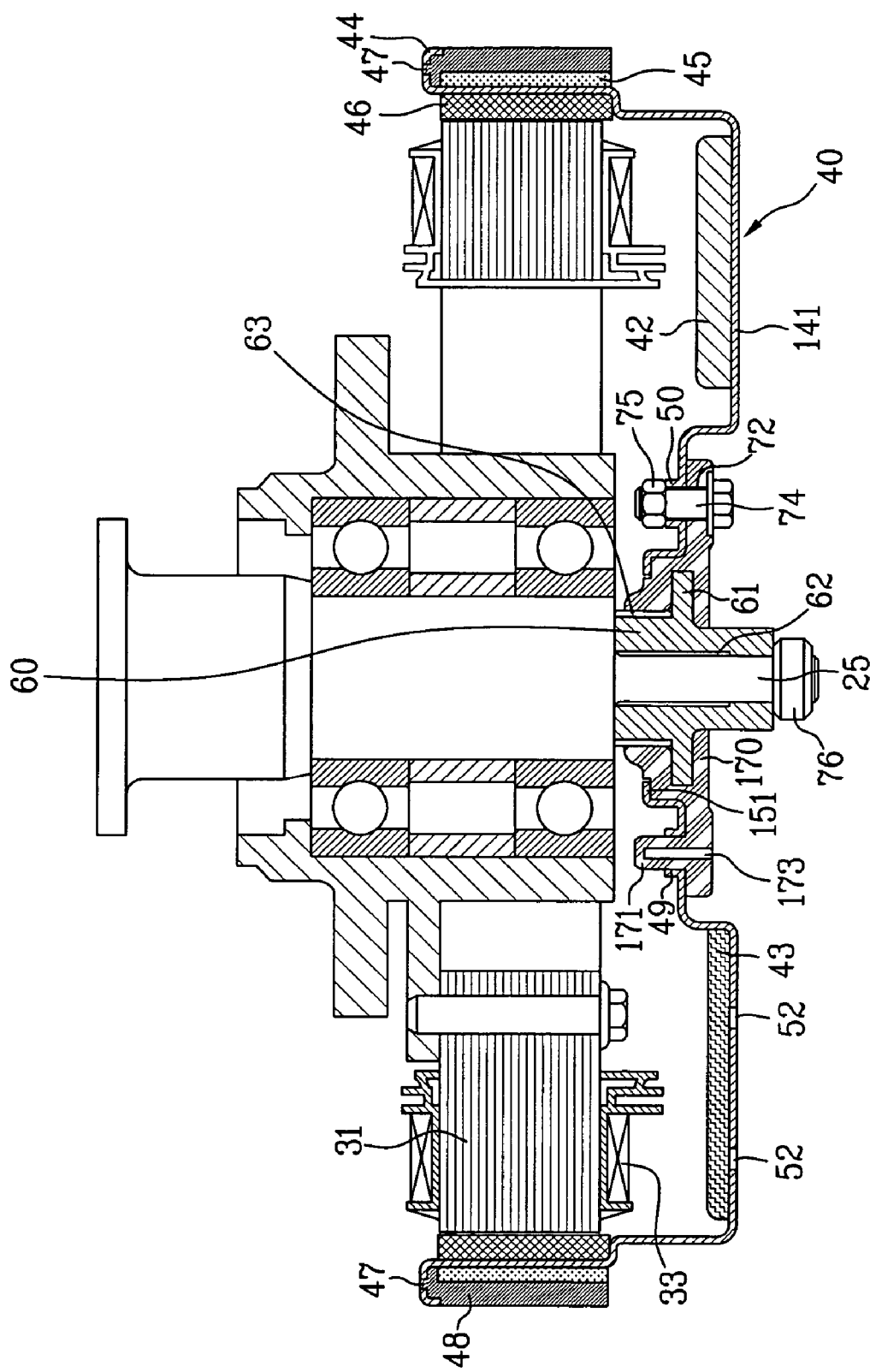
FIG. 9 illustrates a section of key parts of a motor in accordance with a second preferred embodiment of the present invention.

FIG. 9 illustrates a section of key parts of a motor in accordance with a second preferred embodiment of the present invention. The motor in accordance with a second preferred embodiment of the present invention illustrated in FIG. 9 is identical or similar to the motor in accordance with a first preferred embodiment of the present invention in most of the parts, except that the motor of the second embodiment has the bushing 170 fastened from an underside of the rotor frame 141 in an upward direction.

In other words, similar to the first embodiment, the shaft supporting housing 60 is secured to an inside of the bushing 170 as the shaft supporting housing 60 is insert molded with the bushing 170. Different from the first embodiment, the seating projections 171 are projected upward from the bushing 170, and the seating flange 151 is projected upward from the rotor frame 141. This structure enables the bushing 170 to be placed from a lower side to an upper side of the rotor frame 141, and to be secured at the position. The reference numeral 173 denotes a cooling hole for preventing deformation of the seating projection 171 during cooling after molding.

Figure 10:
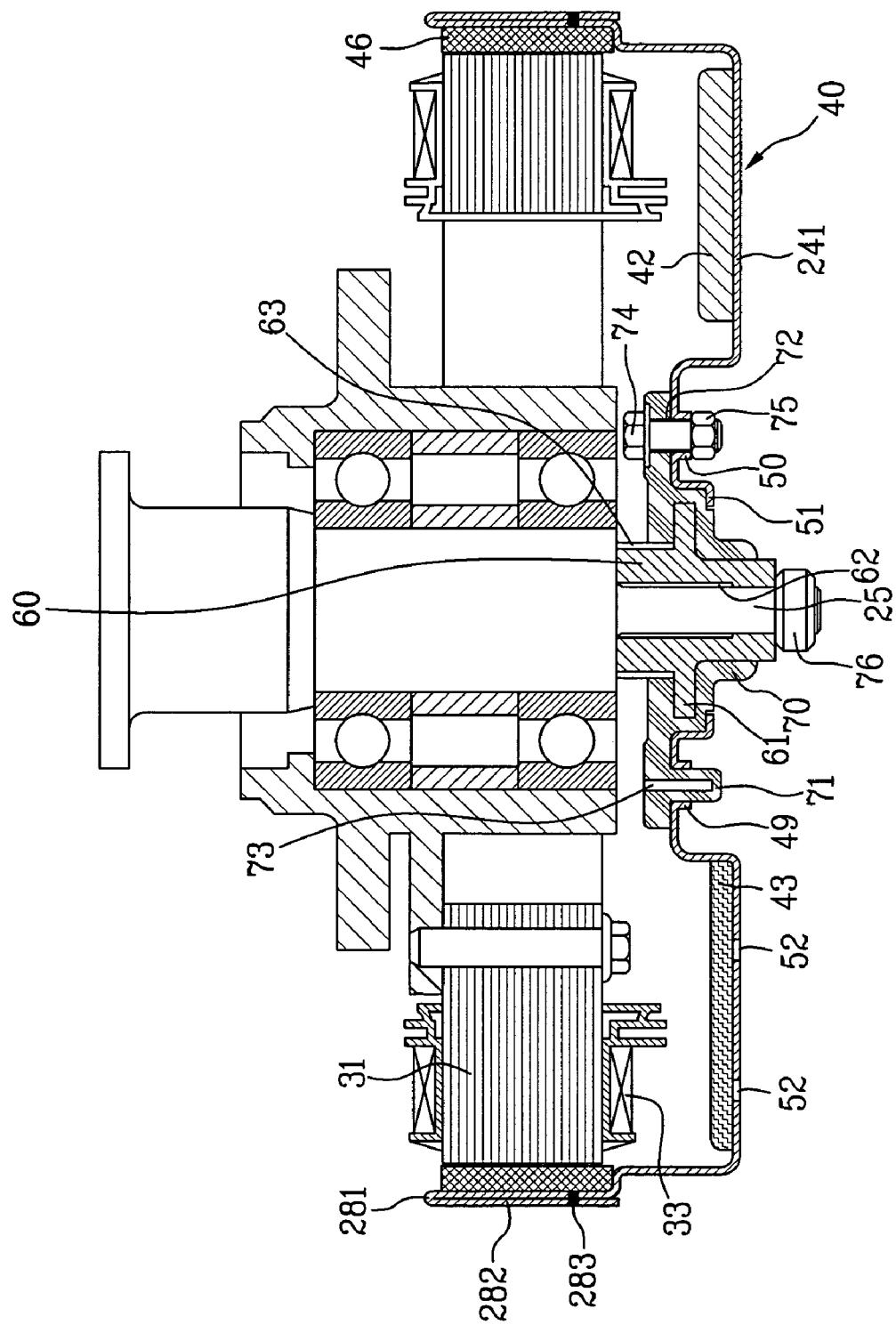
FIG. 10 illustrates a section of key parts of a motor in accordance with a third preferred embodiment of the present invention.
Figure 11:
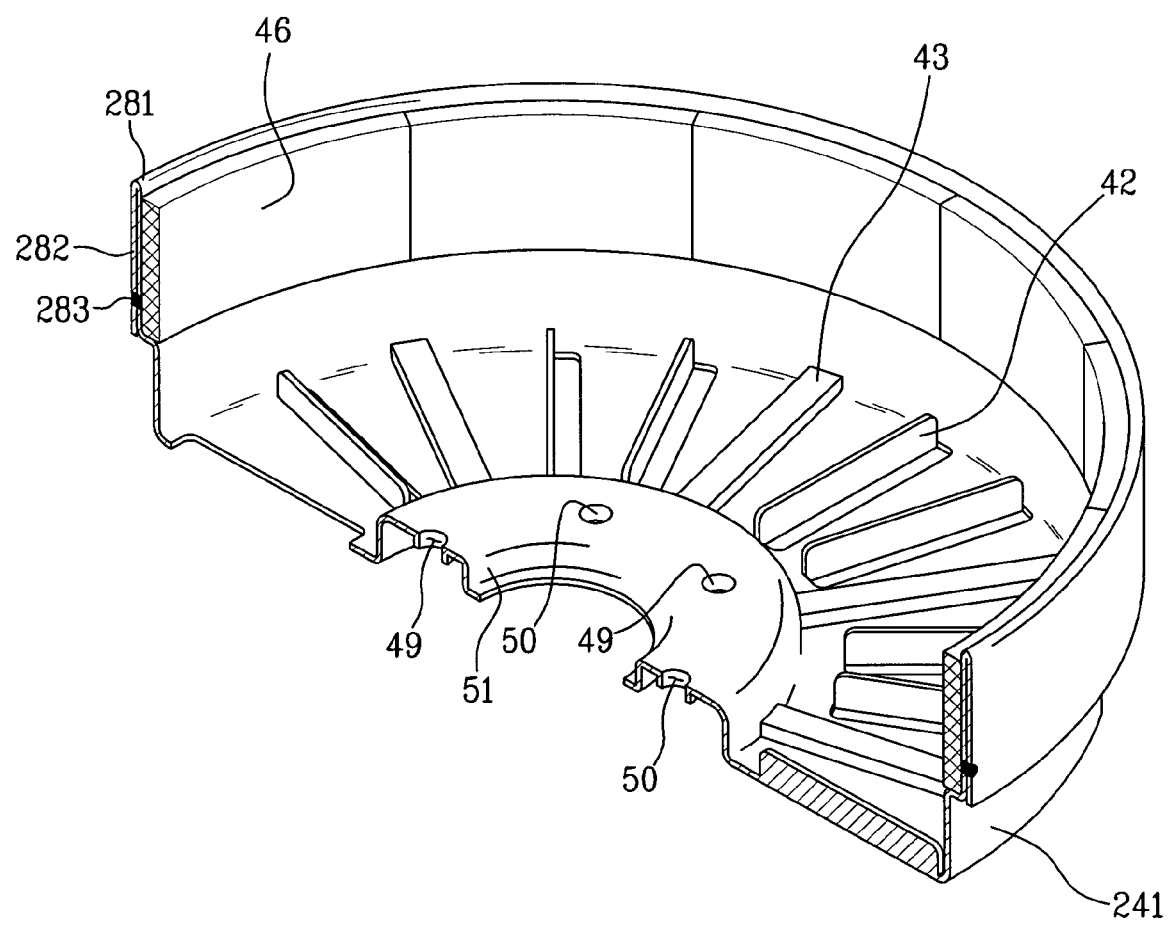
FIG. 11 illustrates a perspective view of a rotor frame of the motor in FIG. 10, with a partial cut away view.

FIGS. 10 and 11 illustrate motors in accordance with a third preferred embodiment of the present invention. A basic configuration of this embodiment is identical to the first embodiment, except that a rotor frame 241 of the motor of the third embodiment has an outer end portion bent at a bent portion 281 by 180° to overlap in two layers, to form a back yoke 282. The back yoke 282 is secured to an outside of the rotor frame 241 with a joint portion 283. If the end portion of the rotor frame 241 is bent to overlap in two layers, the outside circumferential portion of the rotor frame 241 can have a thickness thicker than a required thickness.

A total thickness of the outer end portion of the rotor frame 241 bent at the bent portion 281 enables the back yoke 282 to form a magnetic path. Moreover, the back yoke can serve as a reinforcing portion for preventing deformation of the rotor frame 241 during rotation by reinforcing strength of the rotor frame 241.

In the meantime, because the back yoke 282 is a bent portion, the back yoke 282 has an elastic force for restoring to an original shape. The joint portion serves to prevent deformation of the back yoke 282 by the elastic force. The joint portion 283 may be formed by various methods, such as welding, screw fastening, and so on, as far as the opposite sides of the bent rotor frame 241 are joined.

Moreover, though it is shown in the drawing that the back yoke 282 is formed by bending the rotor frame once, the rotor frame 241 may be bent twice, or more than two times within a range where processing of the rotor frame 241 permits, to form the back yoke at a thickness that is comparatively thick. In addition to this, in order to process the bending of the outer end portion of the rotor frame 241 in formation of the back yoke 282, an edge of the rotor frame may be cut in a triangular shape at regular intervals, before bending, during formation of the back yoke 282.

Figure 12:
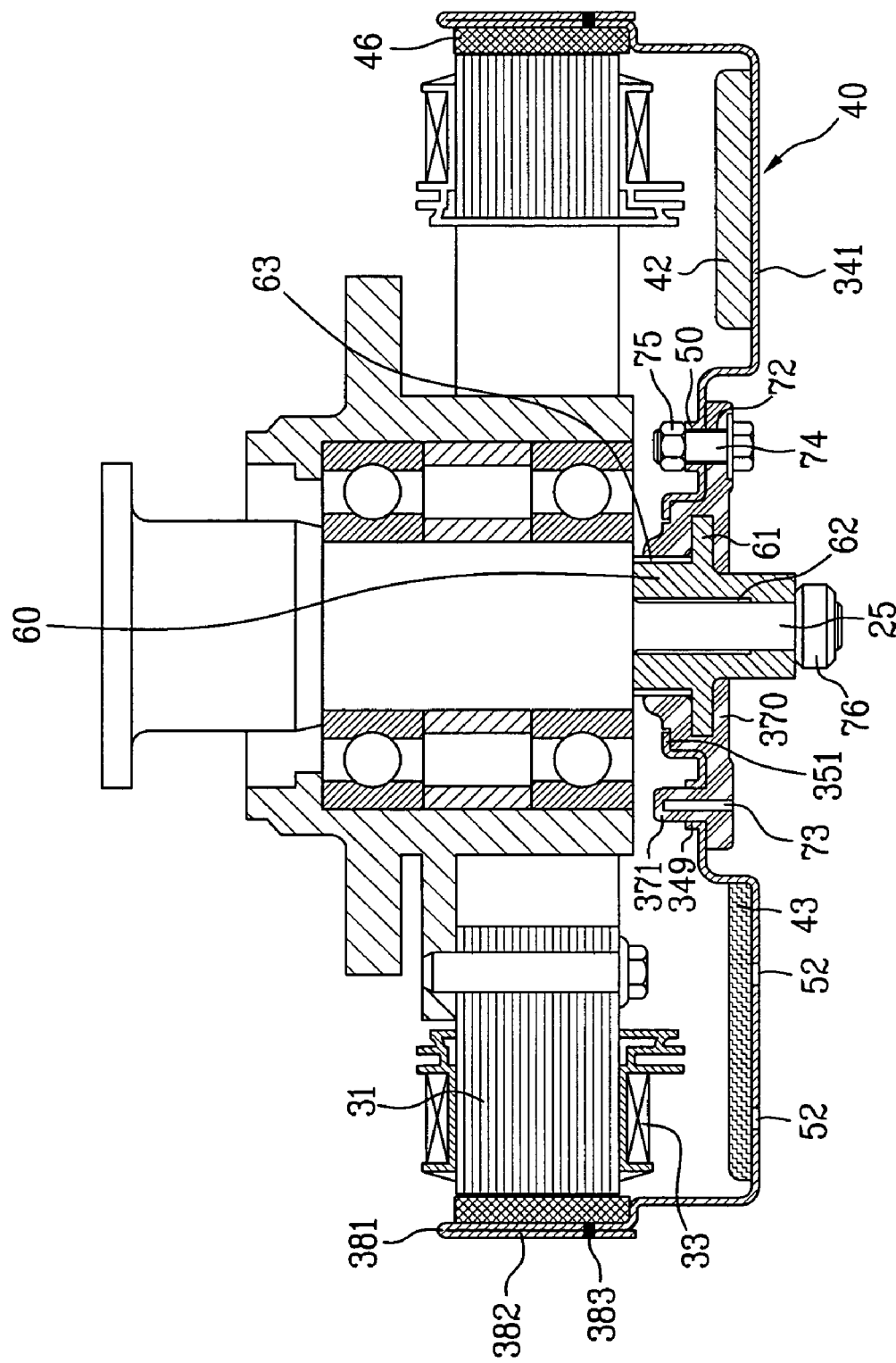
FIG. 12 illustrates a section of key parts of a motor in accordance with a fourth preferred embodiment of the present invention.
Figure 13:
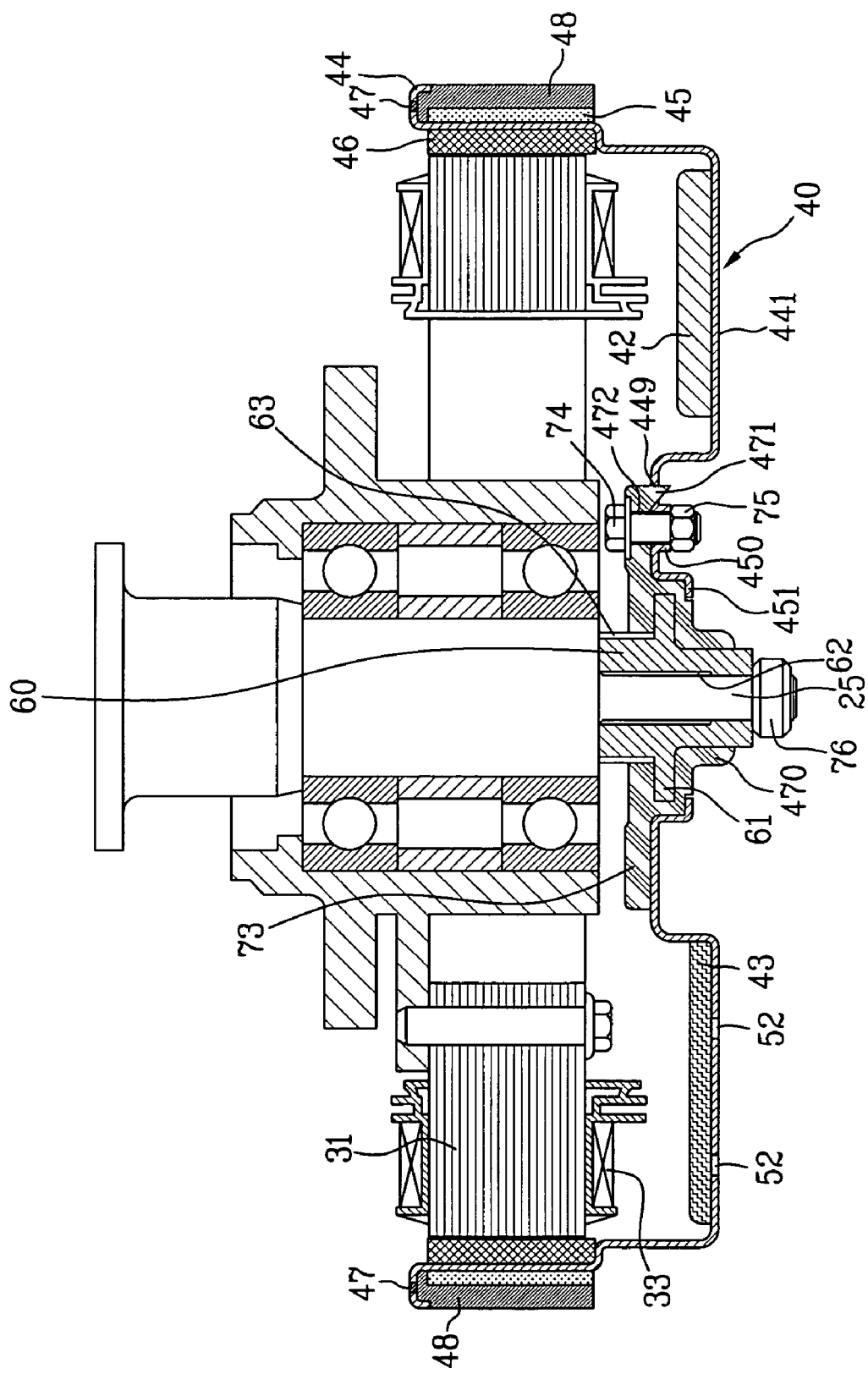
FIG. 13 illustrates a section of key parts of a motor in accordance with a fifth preferred embodiment of the present invention.
Figure 14:
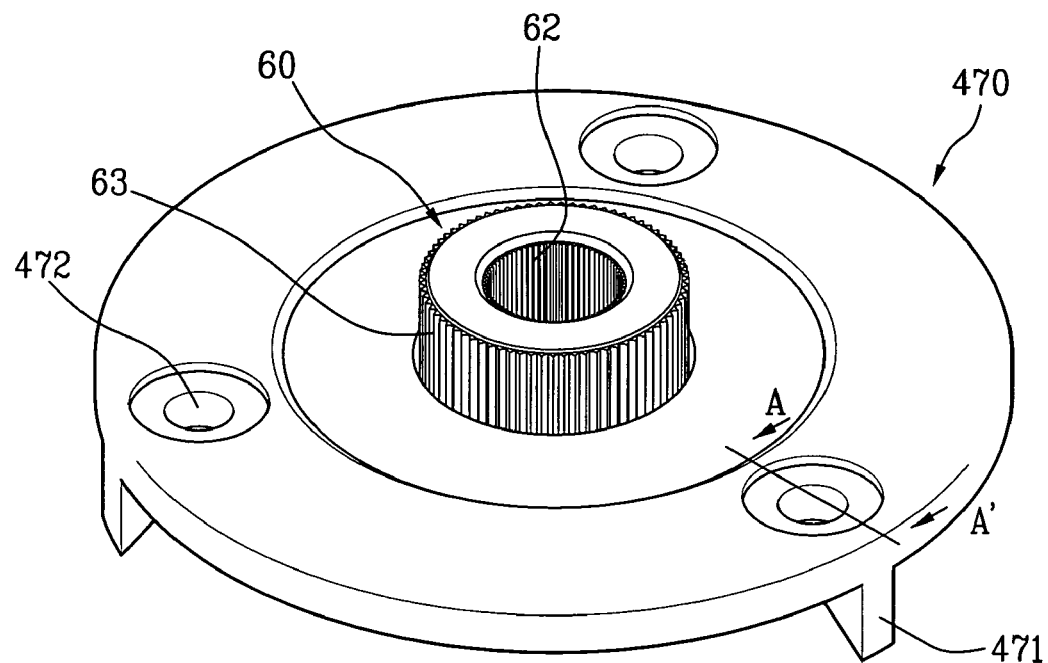
FIG. 14 illustrates a perspective view of a busing in the motor of FIG. 13.
Figure 15:
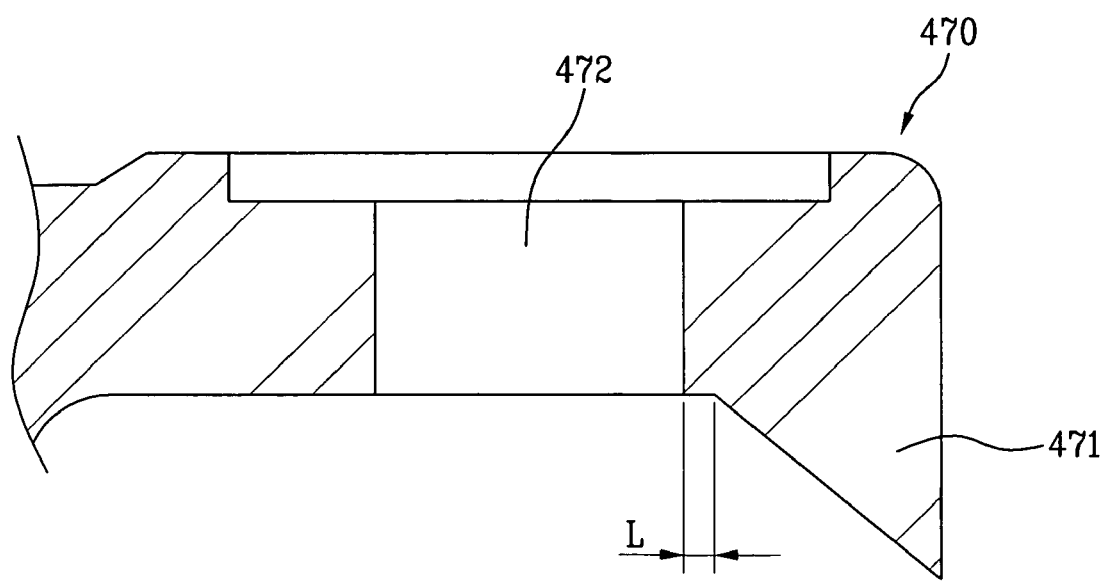
FIG. 15 illustrates a section across A-A in FIG. 14.
Figure 16:
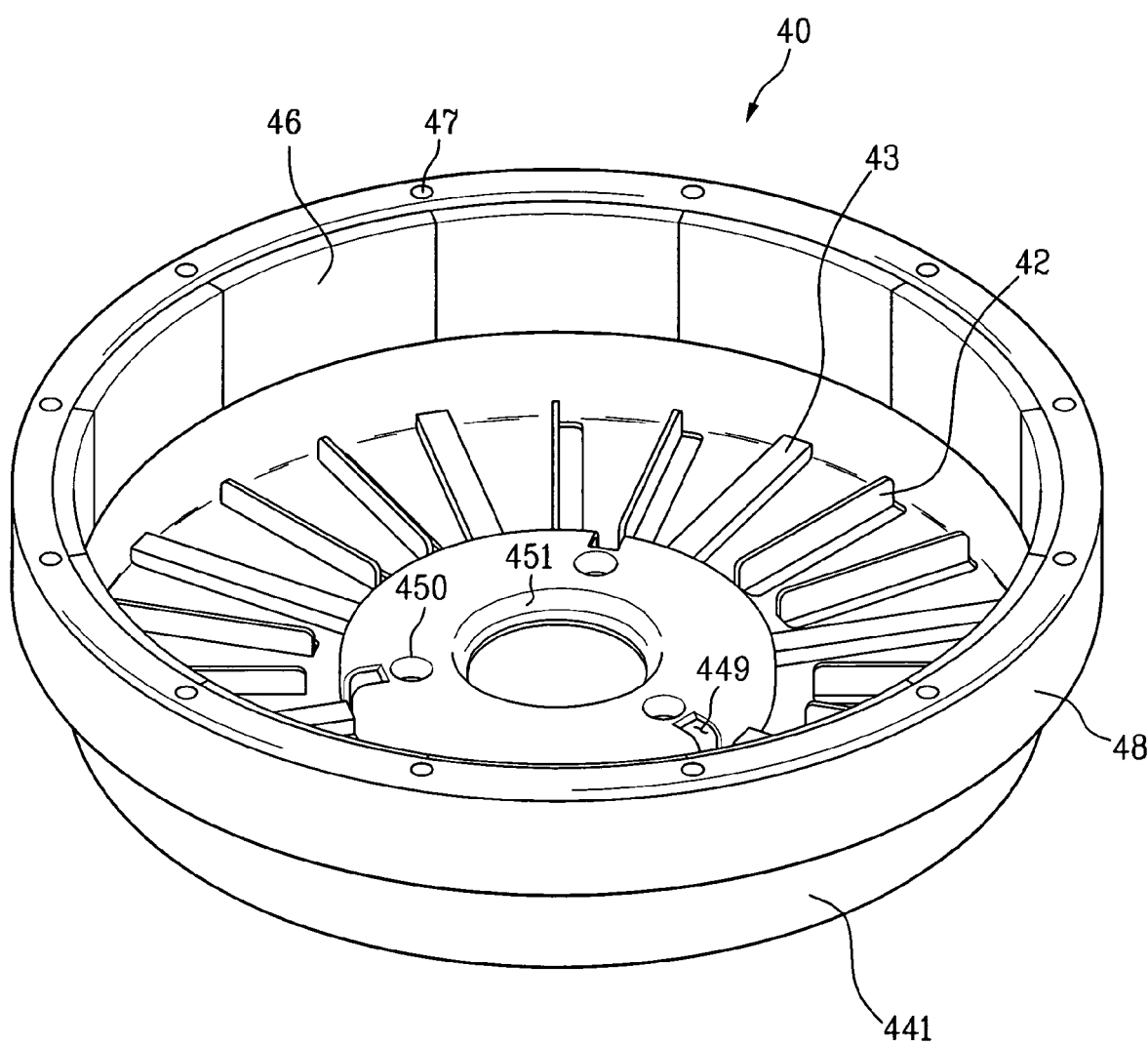
FIG. 16 illustrates a perspective view of a rotor frame of the motor in FIG. 13.

FIG. 12 illustrates a section of key parts of a motor in accordance with a fourth preferred embodiment of the present invention, which is a variation of the motor in FIG. 10. Similar to the motor in the third embodiment, the fourth embodiment motor has the outer end portion of the rotor frame 341 bent at a bent portion by 180°, to overlap in two layers, so that the overlapped portion serves as a back yoke 382. However, similar to the second embodiment motor, the motor of the fourth embodiment has the bushing 370 fastened upward from an underside of the rotor frame 341.

In more detail, the shaft supporting housing 60 is secured to an inside of the bushing 370 as the shaft supporting housing 60 is insert molded in the bushing 370. The seating flange 351 projects upward from the rotor frame 341. The seating projections 371 project upward from the bushing 370, and insert in the seating guides 349 on the rotor frame 341. This structure allows for an upward arrangement of the bushing 370 from the underside of the rotor frame 341 and fastening of the bushing 370 to the rotor frame 341 with bolts 74 and nuts 75.

FIGS. 13 to 16 illustrate motors in accordance with a fifth preferred embodiment of the present invention. The motor in accordance with a fifth preferred embodiment of the present invention is the same as the motor in accordance with a first preferred embodiment of the present invention, except that the configurations of the seating projections 471 and the seating guides 449 for positioning the bushing 470 at the frame 441 of the fifth embodiment are different from the first embodiment.

In more detail, the bushing 470 of the fifth embodiment motor has three bushing side fastening holes 472 at regular intervals. There is the seating projection 471 on an underside of the bushing 470 in the vicinity of each of the bushing side fastening holes 472 for reinforcing the bushing side fastening hole 472.

At a center of the rotor frame 441, there is a seating flange 451 for placing the bushing 470, and three frame side fastening holes 450 aligned with the bushing side fastening holes 450 for fastening the bushing 470 to the rotor frame 441 after the bushing 470 is placed thereon. There is a seating guide 449 on an outer side of each of the frame side fastening holes 450. It is preferable that the seating guide 449 and the frame side fastening hole 450 are positioned in the same radial line, and a distance between each pair of the seating guide 449 and the frame side fastening hole 450 is the same.

It is preferable that the seating projection 471 has a right triangular shape having a height that becomes the higher as it goes toward an outer side. This right triangular shape of the seating projection 471 enables to enhance a crack running suppression effect even if a crack is formed at the bushing side fastening hole 472.

It is preferable that the seating projection 471 and the bushing side fastening hole 472 are spaced by a predetermined distance 'L'. This provides a predetermined distance constructed of a material of the rotor frame 441 between the seating guide 449 of the rotor frame 441 and the frame side fastening hole 450, to enhance a strength of the rotor frame 441.

However, even if there is no space between the bushing side fastening hole 472 and the seating projection 471, strength is maintained because the rotor frame 441 is formed of steel. Moreover, even if it is shown in the drawing that the seating projection 471 extends to an outside circumference of the bushing 470, the extension of the seating projection 471 to the outside circumference of the bushing 470 is not required and the seating projection may end at a position distanced inwardly from the outside circumference of the bushing 470.

The seating projections 471 and the seating guides 449 at the bushing 470 and the rotor frame 441 enable exact positioning of the bushing 470 with respect to the rotor frame 441 as the seating projections 471 are inserted in the seating guides 449 when the bushing 470 is fastened to the rotor frame 441. According to this, the frame side fastening holes 450 and the bushing side fastening holes 472 are aligned exactly, easy placing of the bolts 74 both in the frame side fastening holes 450 and the bushing side fastening holes 472, and fastening with nuts 75.

Moreover, as described, the seating projections 471 and the seating guides 449 not only enable the convenient seating of the bushing 470, but also prevent the bushing 470 suffering from damage.

That is, the seating projections 471 are not only able to guide seating of the bushing 470, but also prevent damaging of the bushing side fastening holes 472 by external force from the bolts 74 because the seating projections 471 are formed in the same radial lines on an outer side of the bushing side fastening holes 472, respectively. In more detail, in order to prevent damaging the bushing side fastening hole 472 disposed at an inside circumferential surface thereof by a force from the bolt 74, the seating projection 471 serves as a reinforcing member at a position in the same radial line with the bushing side fastening hole 472, to stop running of a crack at the seating projection 471 even if the crack starts from the bushing side fastening hole 472, thereby preventing excessive damage of the bushing 470.

Figure 17:
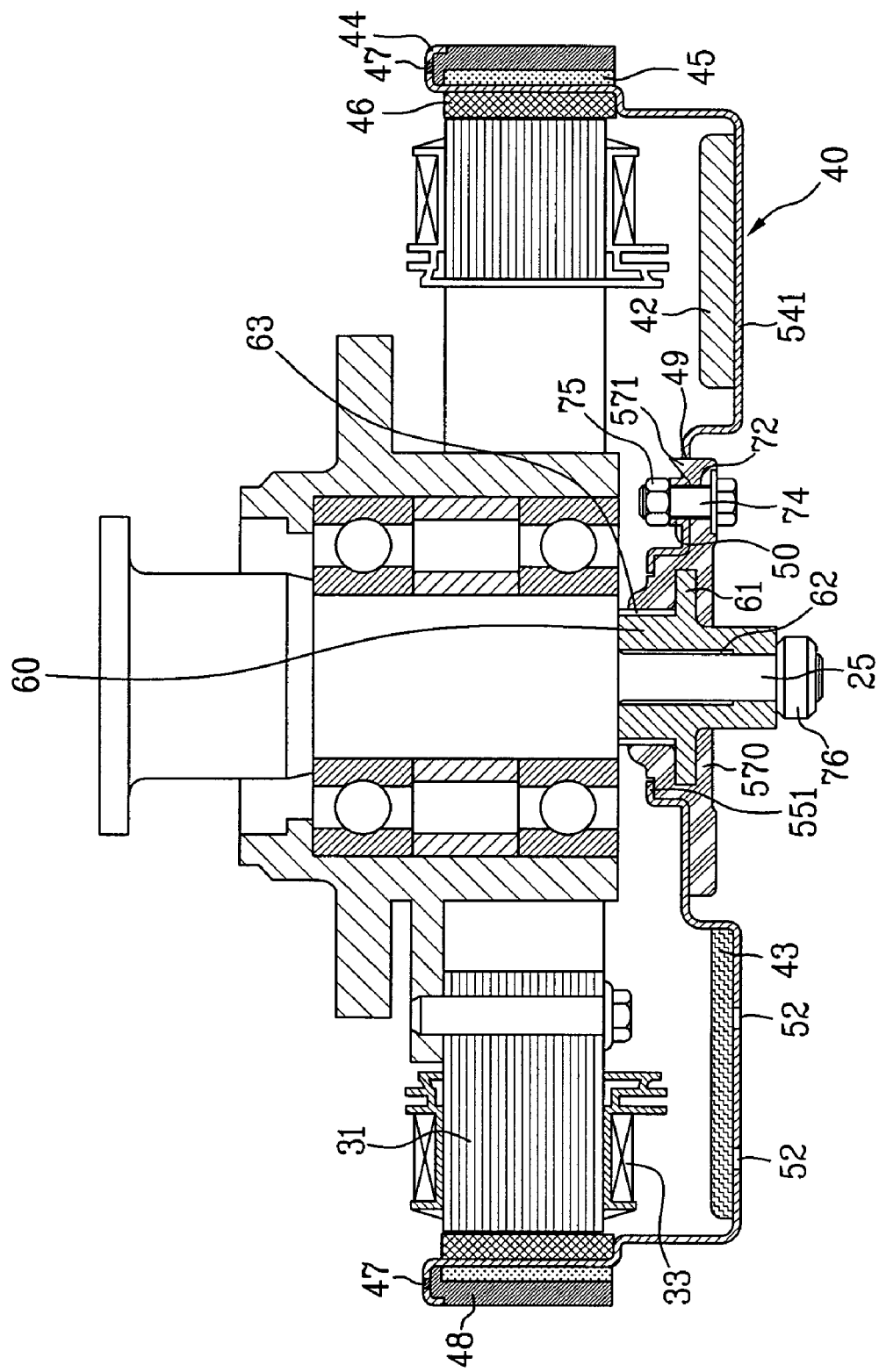
FIG. 17 illustrates a section of key parts of a motor in accordance with a sixth preferred embodiment of the present invention.

FIG. 17 illustrates a motor in accordance with a sixth preferred embodiment of the present invention, which is a variation of the motor in FIG. 12, and different from the motor of the fifth embodiment in that the bushing 570 of the motor of the sixth embodiment is fastened in an upward direction from the underside of the rotor frame 541.

Accordingly, different from the fifth embodiment, the seating projections 571 project upward from the bushing 570, and the seating flange 551 projects upward from the rotor frame 541.

Figure 18:
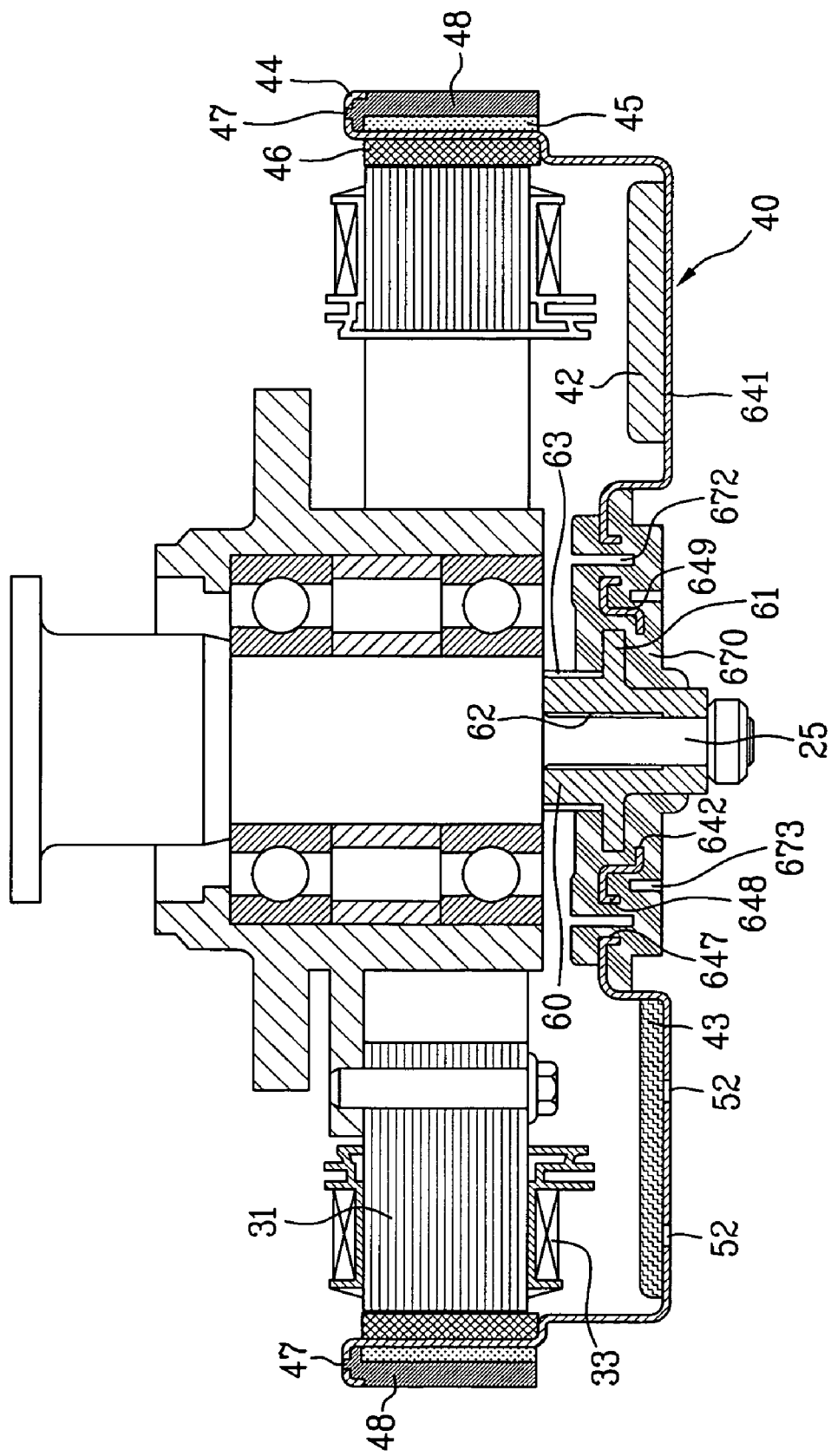
FIG. 18 illustrates a section of key parts of a motor in accordance with a seventh preferred embodiment of the present invention.
Figure 19:
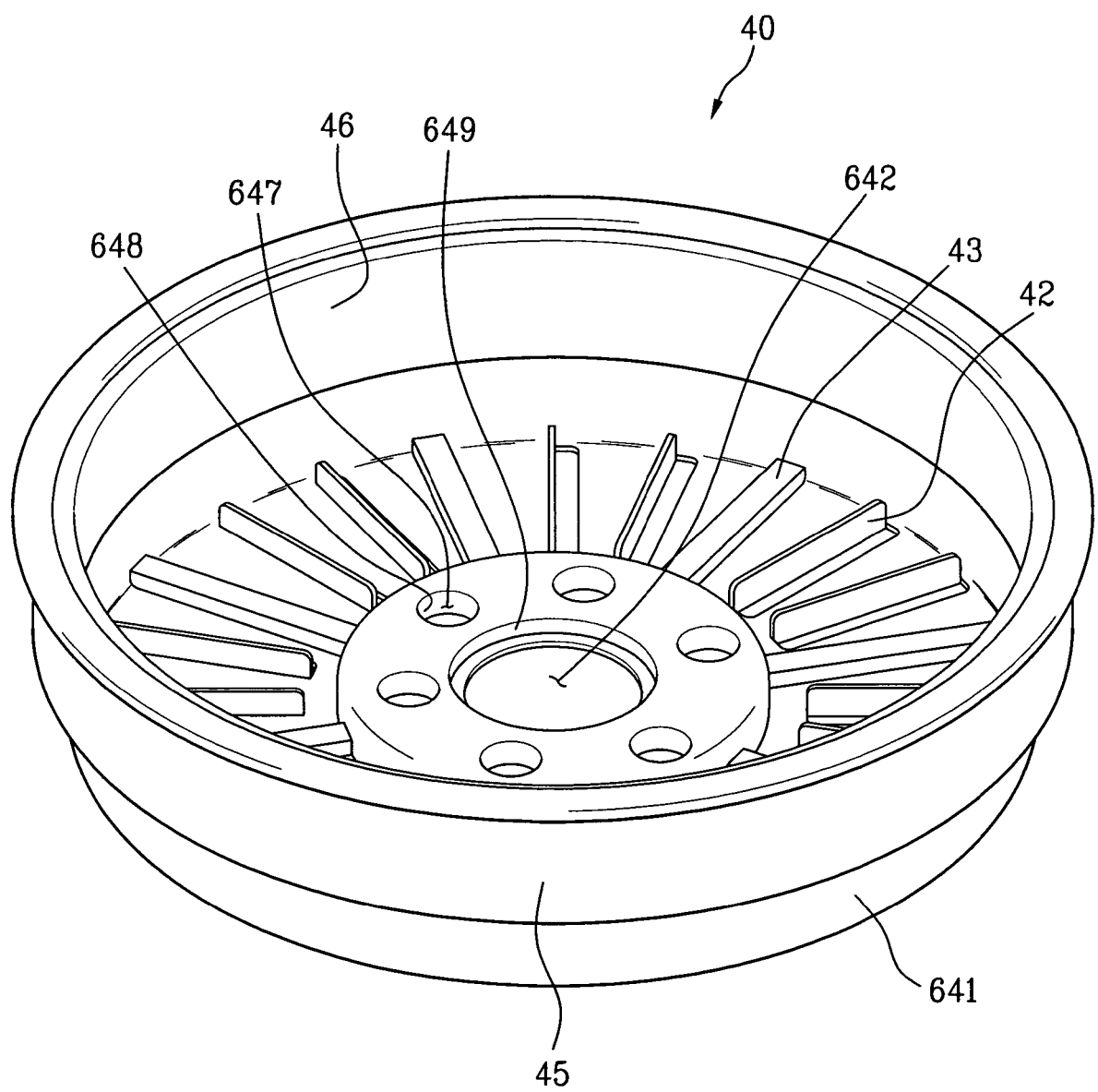
FIG. 19 illustrates a perspective view of a rotor frame of the motor in FIG. 18.

FIGS. 18 and 19 illustrate motors in accordance with a seventh preferred embodiment of the present invention.

In the motor of the seventh embodiment, a shaft supporting housing 60 is insert molded with a rotor frame 641 after the shaft supporting housing 60 is placed at a proper position inside a housing inserting hole 642 at a center of the rotor frame 641, such that the shaft supporting housing 60 is secured at a position, and the injected resin forms a bushing 670.

That is, the bushing 670 is not fastened to the rotor frame 641, not with fastening members, like the bolts and nuts, but fixedly secured to the rotor frame 641 by insert molding with liquid resin injected toward a position in the vicinity of the housing insertion hole 642 after the bushing 670 is placed in the same mold with the rotor frame 641 and the shaft supporting housing 60.

The housing insertion hole 642 of the rotor frame 641 has a first bent surface 649 on an inside circumferential surface. The rotor frame 641 also has sustaining holes 647 at portions where the rotor frame 641 is connected with the bushing 670, such that the liquid resin is injected into and molded on entire areas of an inside and an outside of a center portion of the rotor frame 641. The sustaining hole 647 has a vertical second bent surface 648 extending downward therefrom.

The bushing 670 has vertical first cooling holes 672, and vertical second cooling holes 673 in portions in the sustaining holes 647 of the rotor frame 641, and portions between the first bent surfaces 649 and the housing insertion hole 642. The first cooling holes 672 and the second cooling holes 673 serve to cool down the liquid resin quickly in a process where the bushing 670 is set. The quick cooling down of the bushing 670 prevents possible shrinkage from occurring during setting of the liquid resin, permitting fabrication of the rotor 40 as an original shape.

The simplified process of securing the bushing to the rotor frame in this embodiment permits an easier fabrication of the motor.

In the meantime, even though the motors in all above embodiments have been described taking a motor coupled to a drum type washing machine, particularly, to a motor directly coupled to a drum type washing machine without a belt as an example, the motor of the present invention is applicable to a pulsator type washing machine, or an agitator type washing machine, in an identical or similar fashion.

As has been described, the motor of the present invention has the following advantages.

The easy fabrication of rotor frame of the motor by pressing improves yield. Moreover, the cutting off of a current flowing between the rotor frame and the shaft supporting housing, both are formed of metal which is conductive, with the non-conductive bushing arranged therebetween permits to prevent current from leaking to the driving shaft from the stator through the rotor frame.

The formation of the rotor frame of metal enhances a strength of the rotor frame, as well as operative security of the washing machine. The elimination of complicated injection molding process permits to reduce a time period required for fabrication, and improve the fabrication yield.

The simplification of fabrication of the rotor of the present invention reduces production cost associated with the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A motor for a washing machine, comprising a driving shaft coupled to a drum of the washing machine, a stator for forming a magnetic field with a coil wound on a core, and a rotor rotatably mounted on an outside of the stator, the rotor being coupled to the driving shaft for driving the driving shaft, the rotor comprising:
   a rotor frame formed of metal having magnets attached to an inside surface of an outer end of the rotor frame;
   a back yoke on an outside surface of the outer end of the rotor frame for reinforcing the rotor frame and forming a magnetic path;
   a shaft supporting housing having a projection radiating from an outside circumferential surface of the shaft supporting housing, the shaft supporting housing at a center of the rotor frame and having one end portion of the driving shaft secured thereto;
   a bushing of a non-conductive resin being insert molded about the shaft supporting housing and engulfing at least the projection, where the shaft supporting housing is disposed at a center of the bushing thereby forming one body sharing contiguous surfaces at an interface of at least the projection and the bushing, the bushing being secured to the rotor frame; and
   fastening members for fastening the bushing to the rotor frame.

2. The motor as claimed in claim 1, wherein the shaft supporting housing is formed as one body with the bushing by insert molding.

3. The motor as claimed in claim 1, wherein the shaft supporting housing is formed of metal.

4. The motor as claimed in claim 1, further comprising a guide member for guiding a fastening position of the bushing to the rotor frame.

5. The motor as claimed in claim 4, wherein the guide member includes:
   seating projections which project from the bushing toward the rotor frame; and
   at least one seating guide passing through the rotor frame for inserting the seating projections respectively.

6. The motor as claimed in claim 1, wherein the fastening member includes:
   a plurality of bushing side fastening holes passing through the bushing;
   frame side fastening holes passing through the rotor frame where the frame side fastening holes correspond to the bushing side fastening holes; and
   bolts passing through the bushing side fastening hole and the frame side fastening holes.

7. The motor as claimed in claim 6, further comprising:
   at least one seating projection which projects from the bushing toward the rotor frame; and
   at least one seating guide passing through the rotor frame for inserting the seating projections respectively.

8. The motor as claimed in claim 7, wherein the seating projection and the bushing side fastening hole are spaced from each other.

9. The motor as claimed in claim 7, wherein the seating projection is in a same radial line with, and on an outer side of the bushing side fastening hole.

10. The motor as claimed in claim 7, wherein the seating projection has a right triangular shape that has a height which increases as it goes outward.

11. The motor as claimed in claim 7, wherein the seating projection has a cooling hole for quick cooling of resin.

12. The motor as claimed in claim 1, wherein the bushing is fastened from an upper side of the rotor frame.

13. The motor as claimed in claim 1, wherein the bushing is fastened from a lower upper side of the rotor frame.

14. The motor as claimed in claim 1, wherein the back yoke includes:
   a back yoke member formed of metal attached to an outside circumferential surface of an outer end portion of the rotor frame; and
   a fixing portion for fixing an outside surface of the back yoke member.

15. The motor as claimed in claim 14, wherein the fixing portion includes a molded portion of resin which is insert molded after the back yoke is attached to the rotor frame.

16. The motor as claimed in claim 15, wherein the rotor frame further includes a resin adhering portion at an outer end portion for inserting and fixing the resin during molding.

17. The motor as claimed in claim 1, wherein the back yoke includes an overlapped portion formed by bending the outer end of the rotor frame, and overlapping the outer end on an outside circumferential surface of the rotor frame.

18. The motor as claimed in claim 17, further comprising a joint portion for fixedly securing the back yoke to the outside surface of the rotor frame.

19. The motor as claimed in claim 17, wherein the back yoke is formed by bending an outer end portion of the rotor frame downward.

20. The motor as claimed in claim 17, wherein the back yoke is formed by bending an outer end portion of the rotor frame by 180° to overlap on the outside surface of the rotor frame.

21. The motor as claimed in claim 1, wherein the driving shaft has a serration at one end portion, the shaft supporting housing has a hole at a center for inserting the one end portion of the driving shaft, and the hole has an internal serration for engaging the serration on the driving shaft.

22. The motor as claimed in claim 1, wherein the shaft supporting housing includes projections from an outside circumferential surface for enhancing a joining strength in the molding.

23. The motor as claimed in claim 1, wherein the shaft supporting housing is formed of metal.

24. The motor as claimed in claim 1, further comprising a plurality of spaced apart projections radiating from an outside circumferential surface of the shaft supporting housing.

25. A motor for a washing machine, comprising a driving shaft coupled to a drum of the washing machine, a stator for forming a magnetic field with a coil wound on a core, and a rotor rotatably mounted on an outside of the stator, the rotor being coupled to the driving shaft for driving the driving shaft, the rotor comprising:
   a rotor frame formed of metal having magnets attached to an inside surface of an outer end of the rotor frame;
   a back yoke on an outside surface of the outer end of the rotor frame for reinforcing the rotor frame and forming a magnetic path;
   a shaft supporting housing of metal having a projection radiating from an outside circumferential surface of the shaft supporting housing, the shaft supporting housing at a center of the rotor frame and having one end portion of the driving shaft secured thereto;
   a bushing of a non-conductive resin being insert molded about the shaft supporting housing and engulfing at least the projection, where the shaft supporting housing is disposed at a center of the bushing thereby forming one body sharing contiguous surfaces at an interface of at least the projection and the bushing, the bushing being secured to the rotor frame;
   fastening members for fastening the bushing to the rotor frame; and
   guide members for guiding a fastening position of the bushing to the rotor frame.

26. The motor as claimed in claim 25, wherein the guide member includes;
   seating projections which project from the bushing toward the rotor frame; and
   at least one seating guide passing through the rotor frame for inserting the seating projections respectively.

27. The motor as claimed in claim 25, wherein the fastening member includes;
   a plurality of bushing side fastening holes passing through the bushing;
   frame side fastening holes passing through the rotor frame where the frame side fastening holes correspond to the bushing side fastening holes; and
   bolts passing through the bushing side fastening hole and the frame side fastening holes.

28. The motor as claimed in claim 27, the guide member includes;
   at least one seating projection which projects from the bushing toward the rotor frame; and
   at least one seating guide passing through the rotor frame for inserting the seating projections respectively.

29. The motor as claimed in claim 28, wherein the seating projection and the bushing side fastening hole are spaced from each other.

30. The motor as claimed in claim 28, wherein the seating projection is in a same radial line with, and on an outer side of the bushing side fastening hole.

31. The motor as claimed in claim 25, wherein the back yoke includes an overlapped portion formed by bending the outer end of the rotor frame and overlapping the outer end on an outside circumferential surface of the rotor frame.

32. The motor as claimed in claim 31, further comprising a joint portion for fixedly securing the back yoke to the outside surface of the rotor frame.

33. The motor as claimed in claim 25, wherein the back yoke includes:
   a back yoke member of metal attached to an outside circumferential surface of an outer end portion of the rotor frame, and
   a fixing portion for fixing an outside surface of the back yoke member.

34. The motor as claimed in claim 33, wherein the fixing portion includes a molded portion of resin which is insert molded after the back yoke is attached to the rotor frame.

35. The motor as claimed in claim 34, wherein the rotor frame further includes a resin adhering portion at an outer end portion for inserting and fixing the resin during molding.

36. The motor as claimed in claim 25, further comprising a plurality of spaced apart projections radiating from an outside circumferential surface of the shaft supporting housing.

37. A motor for a washing machine, comprising a driving shaft coupled to a drum of the washing machine, a stator for forming a magnetic field with a coil wound on a core, and a rotor rotatably mounted on an outside of the stator, the rotor being coupled to the driving shaft for driving the driving shaft, the rotor comprising:
   a rotor frame formed of metal having magnets attached to an inside surface of an outer end of the rotor frame;
   a back yoke on an outside surface of the outer end of the rotor frame for reinforcing the rotor frame and forming a magnetic path;
   a shaft supporting housing having a projection radiating from an outside circumferential surface of the shaft supporting housing, the shaft supporting housing at a center of the rotor frame and having one end portion of the driving shaft secured thereto; and
   a bushing of a non-conductive material being insert molded about the shaft supporting housing and engulfing at least the projection, and the bushing being insert molded with the rotor frame such that the bushing, the shaft supporting housing and the rotor frame form one body, wherein the shaft supporting housing and the bushing share contiguous surfaces at an interface of at least the projection and the bushing, and where the bushing fixedly secures the shaft supporting housing and the rotor frame.

38. The motor as claimed in claim 37, wherein the shaft supporting housing is formed of metal.

39. The motor as claimed in claim 37, wherein the shaft supporting housing includes projections disposed at an outside circumference of the shaft supporting housing for enhancing a molding bonding strength.

40. The motor as claimed in claim 37, wherein the rotor frame includes a plurality of bent portions where the bushing is formed for enhancing a molding bonding strength.

41. The motor as claimed in claim 37, further comprising a plurality of spaced apart projections radiating from an outside circumferential surface of the shaft supporting housing.

* * * * *